(12) United States Patent
Lamanna et al.

(10) Patent No.: US 8,799,329 B2
(45) Date of Patent: Aug. 5, 2014

(54) ASYNCHRONOUSLY FLATTENING GRAPHS IN RELATIONAL STORES

(75) Inventors: Charles Lamanna, Bellevue, WA (US); Rui Chen, Bellevue, WA (US); Michael Wilde, Bothell, WA (US); Ian Miers, Baltimore, MD (US)

(73) Assignee: Microsoft Corporation, Redmond, WA (US)

( * ) Notice: Subject to any disclaimer, the term of this patent is extended or adjusted under 35 U.S.C. 154(b) by 57 days.

(21) Appl. No.: 13/495,261

(22) Filed: Jun. 13, 2012

(65) Prior Publication Data

US 2013/0339396 A1 Dec. 19, 2013

(51) Int. Cl.
*G06F 17/30* (2006.01)

(52) U.S. Cl.
USPC ........................................ 707/803; 707/798

(58) Field of Classification Search
CPC .............. G06Q 10/10; G06F 17/30286; G06F 17/30595
USPC ................................................ 707/803, 798
See application file for complete search history.

(56) References Cited

U.S. PATENT DOCUMENTS

| | | | | | |
|---|---|---|---|---|---|
| 5,819,257 | A | * | 10/1998 | Monge et al. | 1/1 |
| 6,006,233 | A | * | 12/1999 | Schultz | 1/1 |
| 6,029,162 | A | * | 2/2000 | Schultz | 1/1 |
| 6,081,812 | A | * | 6/2000 | Boggs et al. | 1/1 |
| 6,192,371 | B1 | * | 2/2001 | Schultz | 1/1 |
| 6,633,886 | B1 | * | 10/2003 | Chong | 707/798 |
| 6,711,563 | B1 | * | 3/2004 | Koskas | 707/769 |
| 6,904,017 | B1 | * | 6/2005 | Meempat et al. | 370/238 |
| 7,111,232 | B1 | * | 9/2006 | Bascom | 715/209 |
| 7,356,612 | B2 | * | 4/2008 | Rachlin | 709/242 |
| 7,366,988 | B2 | * | 4/2008 | Rachlin | 715/734 |
| 7,454,428 | B2 | * | 11/2008 | Wang et al. | 1/1 |
| 7,660,818 | B2 | | 2/2010 | Lulu | |
| 7,701,877 | B1 | * | 4/2010 | Rozenman et al. | 370/254 |
| 7,707,300 | B1 | * | 4/2010 | Champagne | 709/231 |
| 7,844,629 | B2 | | 11/2010 | Breining et al. | |
| 7,937,694 | B2 | | 5/2011 | Meijer et al. | |
| 8,010,569 | B2 | * | 8/2011 | Mazzagatti | 707/791 |
| 8,495,536 | B2 | * | 7/2013 | Fan et al. | 716/106 |
| 2002/0095421 | A1 | * | 7/2002 | Koskas | 707/100 |
| 2002/0165940 | A1 | * | 11/2002 | Kameoka et al. | 709/218 |

(Continued)

OTHER PUBLICATIONS

Blau, et al., "A Visual Language for Querying and Updating Graphs", Retrieved at <<http://citeseerx.ist.psu.edu/viewdoc/download-?doi=10.1.1.6.642&rep=rep1&type=pdf>>, Technical Report, 2002-037, Univ. of Mass. Amherst Computer Science, 2002, pp. 1-12.

(Continued)

*Primary Examiner* — Phuong Thao Cao
(74) *Attorney, Agent, or Firm* — Louise Bowman; Jim Ross; Micky Minhas

(57) ABSTRACT

An application asynchronously flattens a graph in a relational store to provide fast access to node relationship queries. The application may implement an algorithm that retrieves forward paths of a start node. The algorithm may also retrieve reverse paths of end node. The application may cross-join the forward and reverse paths to determine link paths connecting the start and end nodes. The application may merge the link paths with existing paths. The application may increment path reference counts. The application may store the link paths as a link between the nodes to represent a relationship between the nodes.

19 Claims, 6 Drawing Sheets

(56) References Cited

U.S. PATENT DOCUMENTS

| | | | |
|---|---|---|---|
| 2002/0188748 A1* | 12/2002 | Blackwell et al. | 709/232 |
| 2003/0018584 A1* | 1/2003 | Cohen et al. | 705/52 |
| 2003/0225761 A1* | 12/2003 | Wagener et al. | 707/6 |
| 2004/0064441 A1 | 4/2004 | Tow | |
| 2004/0221041 A1* | 11/2004 | Tabbara | 709/227 |
| 2004/0260833 A1* | 12/2004 | Rachlin | 709/238 |
| 2005/0010606 A1* | 1/2005 | Kaiser et al. | 707/200 |
| 2006/0074858 A1* | 4/2006 | Etzold et al. | 707/3 |
| 2006/0080313 A1* | 4/2006 | Freire | 707/5 |
| 2006/0221842 A1* | 10/2006 | Terry | 370/248 |
| 2007/0130133 A1* | 6/2007 | Lee et al. | 707/4 |
| 2007/0192343 A1* | 8/2007 | Faerber et al. | 707/100 |
| 2007/0208693 A1* | 9/2007 | Chang et al. | 707/2 |
| 2007/0220451 A1* | 9/2007 | Arnone et al. | 716/1 |
| 2007/0299867 A1* | 12/2007 | Baldwin et al. | 707/103 R |
| 2008/0120283 A1 | 5/2008 | Liu et al. | |
| 2008/0222114 A1* | 9/2008 | Schreiber | 707/3 |
| 2009/0049021 A1* | 2/2009 | Chitrapura et al. | 707/3 |
| 2009/0271108 A1* | 10/2009 | Kobori et al. | 701/208 |
| 2010/0036810 A1* | 2/2010 | Wu et al. | 707/3 |
| 2010/0049428 A1* | 2/2010 | Murata et al. | 701/118 |
| 2010/0191718 A1 | 7/2010 | Coriell et al. | |
| 2010/0214960 A1* | 8/2010 | Bahr et al. | 370/255 |
| 2010/0293247 A1* | 11/2010 | Mckee et al. | 709/218 |
| 2010/0306360 A1* | 12/2010 | Duggan et al. | 709/223 |
| 2011/0170428 A1* | 7/2011 | Wang et al. | 370/252 |
| 2012/0011118 A1* | 1/2012 | Gleicher et al. | 707/736 |
| 2012/0033887 A1* | 2/2012 | Tanaka | 382/176 |
| 2012/0096043 A1* | 4/2012 | Stevens, Jr. | 707/798 |
| 2012/0303608 A1* | 11/2012 | Wu et al. | 707/715 |
| 2013/0046798 A1* | 2/2013 | Mankovskii et al. | 707/805 |

OTHER PUBLICATIONS

Paparizos, et al., "Tree Logical Classes for Efficient Evaluation of XQuery", Retrieved at <<http://www.eecs.umich.edu/db/timber/files/tlc.pdf>>, SIGMOD. Proceedings of the ACM SIGMOD international conference on Management of data, Jun. 15, 2004, pp. 71-82.

* cited by examiner

ASYNCHRONOUSLY FLATTENING GRAPHS IN RELATIONAL STORES

BACKGROUND

Modern markets are saturated by user driven data consumption. Applications integrate media and user information from variety of sources to congregate resources in order to meet customer demand. Video and audio information consume warehouses of systems providing instantaneous access to user data across the world. User organized information require resource intensive systems to accommodate the demand. In addition, enterprise requirements complicate information storage and retrieval by inserting business requirements into the storage systems. Relational data in enterprise systems require extensive relational mapping. Alterations to the existing data systems require re-execution of processes to map new relations. Each relational update may take away from resources needed for other demand.

Storing graphs (e.g. user's memberships to distribution groups) in a relational store is in high technical demand. Modern solutions are unable to store graph data efficiently. Systems are slow to computationally read graph data. Directory systems in enterprise businesses frequently implement graph based relational technologies. Graphs are widely used to define relationships between users and distribution groups or security groups. If there is a link between a user and a group, systems consider the user belonging to the group.

A current preferable relational technology is Active Directory® by Microsoft Corporation of Redmond, Wash. Extending Active Directory to support multi-tenancy in a cloud based system is an increasingly difficult challenge. Each additional node in a graph may complicate the resources and processes to efficiently map the relationships between the nodes.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to asynchronously flattening a graph in a relational store. According to some embodiments, an application may retrieve forward paths of a start node from a paths table through a forward expand operation. The application may also retrieve reverse paths of an end node from the paths table through a reverse expand operation. A path may be a connection between two nodes. Next, the application may join the forward paths to the reverse paths through a cross-join to determine link paths. Link paths may be any path having the start node as a source and the end node as a destination. Subsequently, the application may merge the link paths, the forward paths, and the reverse paths in the paths table. The application may insert new link paths not already existing as a forward path or a reverse path. The application may also adjust a reference count of each path in the paths table according to the added link paths. The application may add the link paths as a link into a links table.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
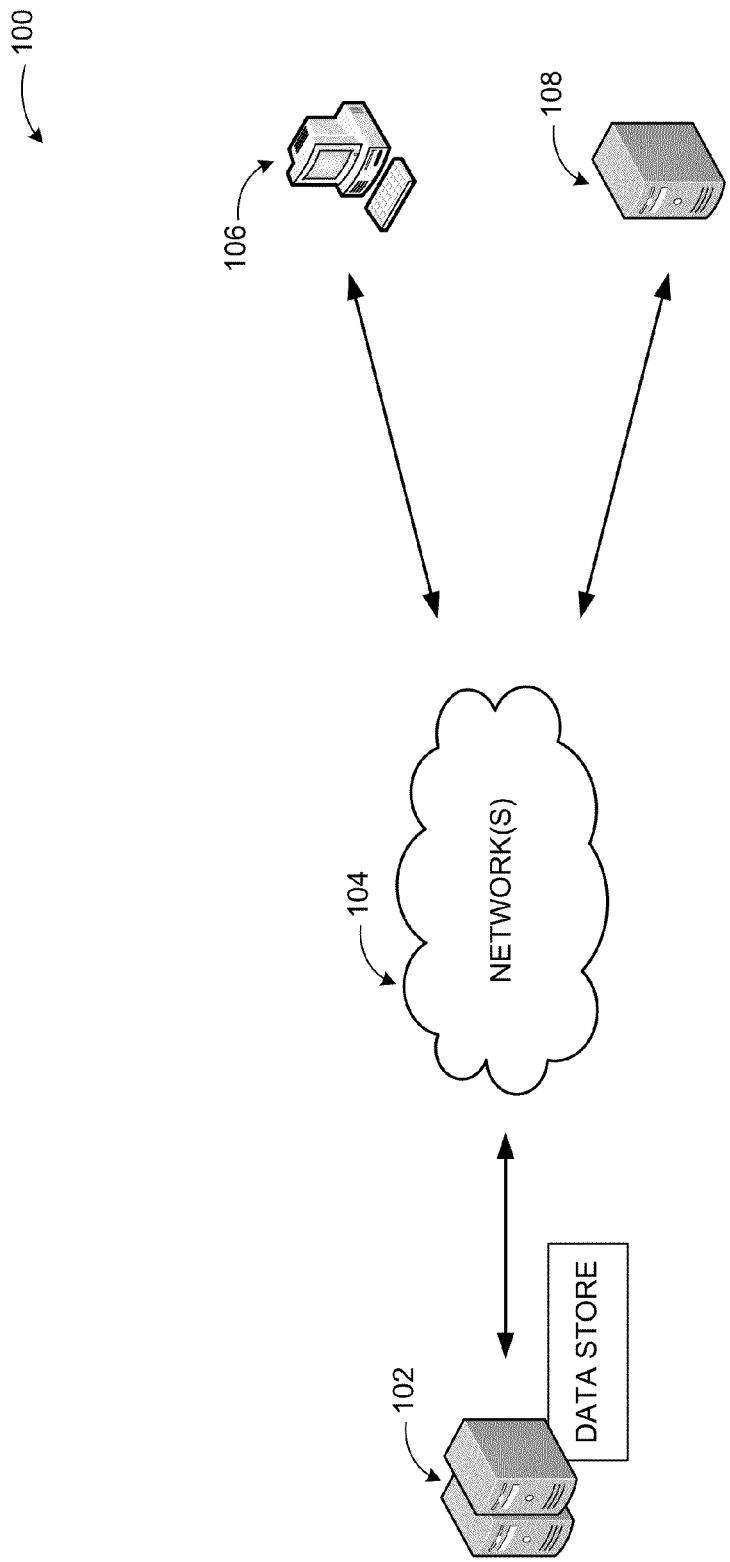
FIG. 1 illustrates a networked environment, where an application may asynchronously flatten graphs in a relational store according to some embodiments.

As briefly described above, an application may asynchronously flatten a graph in a relational store. The application may retrieve forward paths of a start node from the paths table through a forward expanse operation. The application may also retrieve reverse paths of an end node from the paths table through a reverse expanse operation. The application may join the forward and reverse paths through a cross-join to determine link paths. Link paths may be any path having the start node as a source and the end node as a destination. Next, the application may merge the link paths, the forward paths, and reverse paths in the paths table. New link paths not already existing as a forward or a reverse path may be inserted into the paths table. The application may also adjust reference counts in the paths table according to added link paths. The reference counts may be incremental numbers indicating the number of paths. Subsequently, the application may add the link paths as a link into a links table.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to some embodiments, a graph may include nodes and paths connecting the nodes. Multiple paths may connect one node to another. Each node may have outgoing paths referred to as forward paths and incoming paths referred to as reverse paths. A path connecting one node to another may be called a link path. Nodes connected through a link path may be referred to as a source and destination. Paths may be unidirectional or bidirectional. An algorithm may implement processes such as forward expand, reverse expand, and cross join operations to flatten a graph within a data store. The algorithm may be executed as an application. The application may be a stand-alone application or may be part of a programming application interface (API). The algorithm may be written in Structured Query Language (SQL) or similar ones and executed within a data store or a data store application.

Throughout this specification, the term "platform" may be a combination of software and hardware components for asynchronously flattening a graph in a relational store. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates a networked environment, where an application may asynchronously flatten a graph in a relational store according to some embodiments. The computing devices and computing environments shown in diagram 100 are for illustration purposes. Embodiments may be implemented in various local, networked, cloud-based and similar computing environments employing a variety of computing devices and systems, hardware and software.

In an example environment illustrated in diagram 100, a client device 106 may request a query about a relationship between two nodes from data store 102. The client device may be an end user device such as client device 106 (e.g., desktop computer). Alternatively, the client device may be an intermediary consumer such as a server 108. Both client devices 106 and 108 may use network(s) 104 to communicate with the data store 102. The data store may have multiple instances running concurrently across multiple servers or other hardware devices. The data store may store tables for paths and links representing flattened graph of relationships. The data store may execute operations updating the links according to addition and deletions of paths.

The client device 106 may include a variety of devices including a desktop computer, a laptop computer, a slate, a smart phone, and a server 108. In addition, a client application executed within the client device may query links in the data store 102. An example query may be search for a link such as users within a group. The group may be a start node and the user may be an end node. The data store 102 may be a relational store and may have multiple instances. In addition, the data store may provide data services within a distributed environment managing data requests to varying hardware and software components according to load requirements and organizational requirements such as compartmentalized data access.

Figure 2:
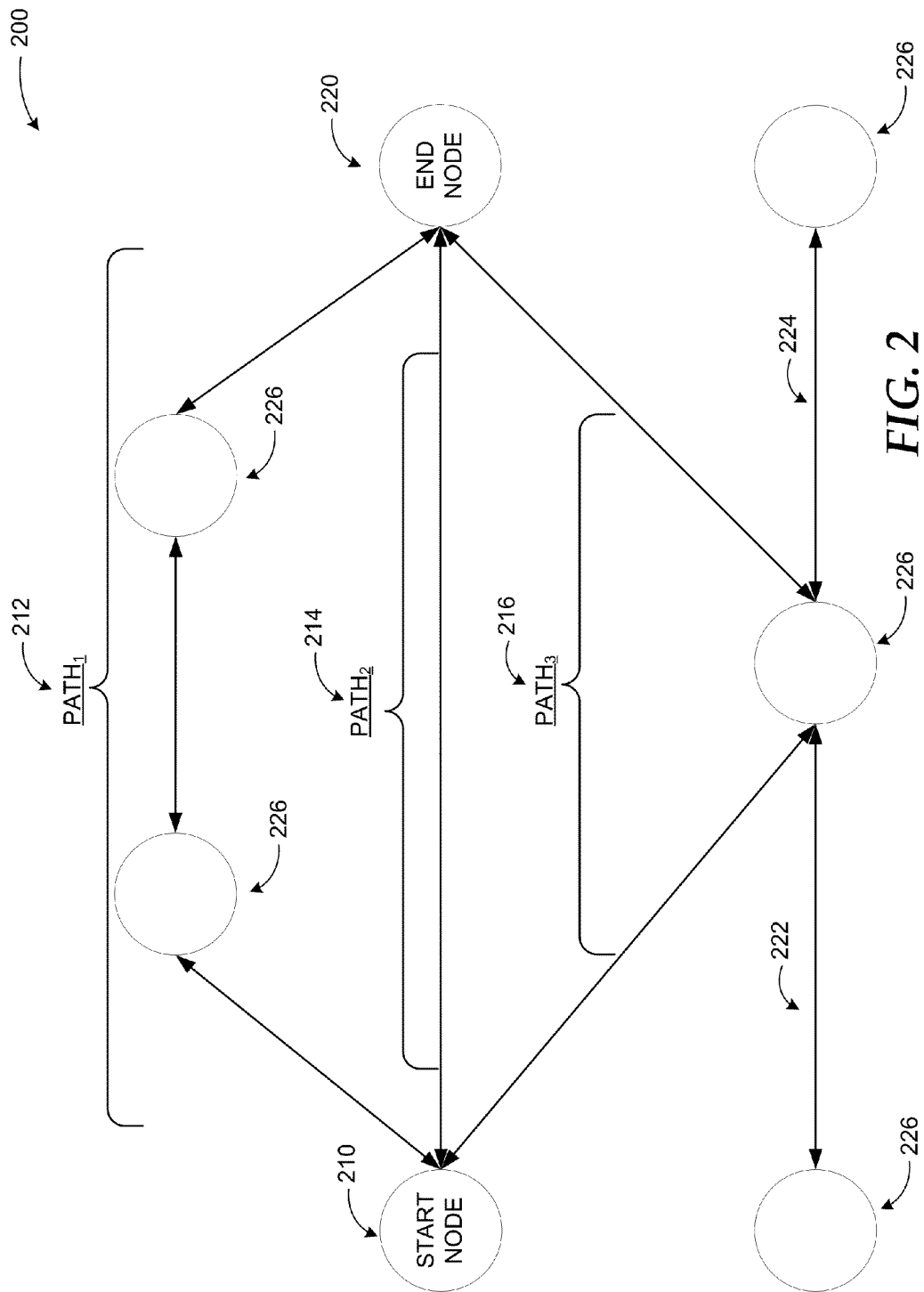
FIG. 2 illustrates an example entity diagram where a graph may be asynchronously flattened in a relational store according to embodiments.

FIG. 2 illustrates an example entity diagram where a graph may be asynchronously flattened in a relational store according to embodiments. Diagram 200 displays nodes and paths in between nodes. A path between a start node and an end node may be a link path. The start node in a link path may be a source. The end node in the link path may be a destination. Examples of start and end nodes may include groups and users. The start node may be a group and an end node may be a user for a query to find number of users in a group. Alternatively, the start node may be a user and end node may be a group for a query to find number of groups a user belongs to.

Start node 210 may have multiple forward paths. The paths may lead to other nodes 226 or may lead to end node 220. $Path_2$ 214 connecting start node 210 and end node 220 may be a link path. Alternative forward paths and reverse paths may also connect start node 210 to the end node 220. $Path_1$ 212 may be a link path connecting the start node 210 and end node 220 nodes through intermediary nodes. In another example scenario, the start node 210 may be connected to the end node 220 through a link $path_3$ 216 through an intermediary node (one of the other nodes 226). Alternatively reverse path 222 from end node 220 may not connect with the start node. As such, the reverse path 222 may not be a link path. In yet another alternative example, a forward path 224 from start node 210 may not connect with the end node. As such, the forward path 224 may also not be a link path.

According to some embodiments, the start node may be a group and the end node may be group. Alternatively, the start and end nodes may be users. The path may define a relationship between the start and end nodes.

Figure 3:
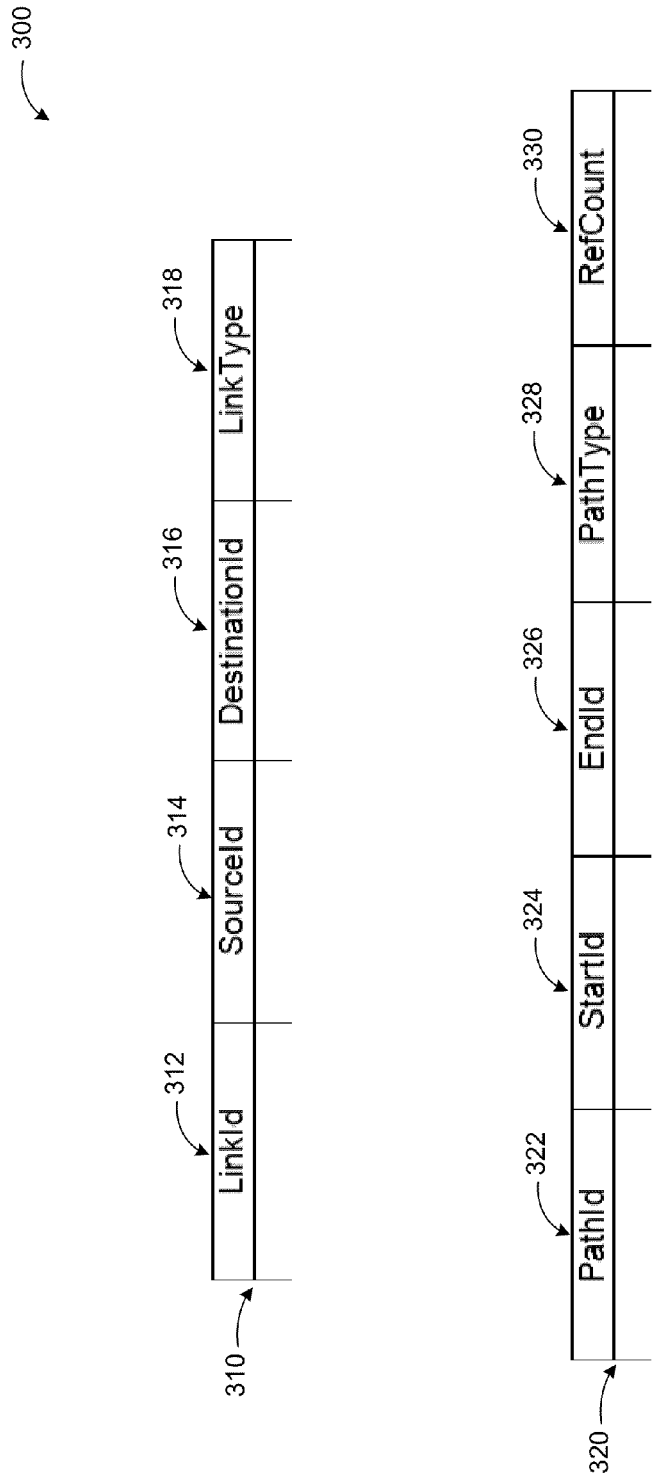
FIG. 3 illustrates example tables of a relational store where a graph may be asynchronously flattened according to embodiments.

FIG. 3 illustrates example tables of a relational store where a graph may be asynchronously flattened according to embodiments. Diagram 300 displays a links table 310 and a paths table 320. The links table may include links. Each link may be a sum of all link paths having a source identification (id) 314 matching a start id 324 of a path in the paths table. Each link path may also have destination id 316 matching and end id 326 of a path in the paths table. Additionally, the link table 310 may have link id 312 and link type 318 elements for each link providing information about the link. Each path in the path table 320 may have a path id 322 and path type 328 providing information about the path. The link type 318 and path type 328 may indicate whether the path is bidirectional or unidirectional. If the link or path is unidirectional, the link type 318 and the path type 328 may indicate the direction of the link. Furthermore, a reference count (refcount) 330 may be an incremental number. The refcount 330 may be incremented or decremented for each addition or deletion of a path into the paths table. The reference count may be used to count the number paths between a start node and an end node. As such, a reference count may be used to predict number of possible paths linearly in a link.

According to some embodiments, an algorithm of the application flattening graphs in a relational store may use a forward expand operation to determine forward paths. The forward expand operation may be an SQL select statement. An example may be:
select Paths.EndId
from Paths
where Paths.StartId=@groupId and Paths.RefCount>0
In the above example the groupId may be an identification of the start node.

According to other embodiments, the algorithm may use a reverse expand operation to determine reverse paths. The reverse expand operation may be an SQL select statement. An example may be:
select Paths.StartId
from Paths
where Paths.EndId=@userId and Paths.RefCount>0
In the above example the userId may be an identification of the end node.

According to yet other embodiments, links may be inserted and removed within the links table according to add and remove operations. In an example scenario an operation may include add(link1) where link1 describes start node to end node.

In an example scenario, the algorithm may find all nodes that are accessible via an end node by: set D'=forward expand (end node) which yields {D0, D1, D2, ... Dn}. The algorithm may use past results (e.g. flattening one link relies on the flattening of past links) to dynamically flatten a graph. Dynamic flattening the graph may lead to performance gains compared to graph only based solutions. The forward expand operation may query the paths table (as defined above). The operation may be highly performant query due to the characteristics of the table's clustered index. The operation may also be highly performant as a result of the table's organization as (O(log(n))). The algorithm may add the end node to D' and conclude the forward expand operation.

In another example scenario, the algorithm may find all nodes that can reach start node. The algorithm may set S'=reverse expand(start node) which may yield {S0, S1, S2, ... Sn}. The reverse expand operation may query the paths table and may be highly performant The algorithm may add the start node to S' and conclude the reverse expand operation.

In yet another example scenario, the algorithm may determine all paths connecting the start node and the end node through a cross-join operation. All nodes (that can reach start node) may need to have paths added for all nodes reachable by the end node. The application may need to increase the reference count as appropriate to handle alternate paths. The algorithm may let E'=D' cross join S'. The cross join may be the key set operation enabling the algorithm to be implemented in an efficient manner in a relational data store. An example of a cross join operation may be an SQL statement:

```
select
    sources.id_StartId as StartId
    ,destinations.id_DestinationId as EndId
    ,sources.RefCount * destinations.RefCount as RefCount
from
    PathTvp destinations
cross join
    PathTvp sources
order by StartId
```

Destinations and sources may be temporary tables holding the forward and reverse paths from the forward and reverse expand operations. The application may cross-join the sources and destinations tables. PathTvp may represent a path. The application may merge E' into the existing paths table and add the increase in refcount to the existing refcount in the paths table. The application may insert link1 into the links table.

Alternatively, the algorithm may implement a remove (link1) operation where link1 may describe StartNode→EndNode. The algorithm may re-execute the forward expand, reverse expand, and cross-join operations subsequent to deleting link1 to remove broken paths. However, unlike adding a link, the algorithm may subtract from the refcount. If a path has a 0 refcount (indicating it may no longer exist), the application may remove the path.

According to other embodiments, the algorithm's complexity may depend on the cross join operation. However, the cross join operation may consistently produce few records, or O(# of nested nodes). The size of the cross-join operation may be O(# of nested nodes*number of nodes). For a majority of links, the cross-join may produce a small number of link paths.

According to further embodiments, the application may delete the link subsequent to detecting removal of all link paths within the link from the paths table. Alternatively, the application may delete all link paths of a link from the paths table subsequent to detecting removal of the link from the links table. The application may also execute the forward expand, reverse expand, and cross-join operations subsequent to detecting addition of a new path starting from the start node or a new path ending in the end node. Additionally, the application may also execute the forward expand, reverse expand, and cross join operations subsequent to detecting deletion of a forward path starting from the start node or a reverse path ending in the end node. Furthermore, the application may group link paths of a link by a source id or a destination id.

According to some embodiments, a data store may include SQL procedures to realize asynchronous flattening of a graph in a relational store. Although not provided as a limiting example, the following may be an example pseudo code procedure to realize graph flattening:

```
ALTER PROCEDURE [dbo].[FlattenLinks]
    @batchSize INT = 50
WITH RECOMPILE -- Recompile to make sure table statistics are accurate
AS
BEGIN
    SET NOCOUNT ON ;
    DECLARE @i_ReturnCode       INT ;
    DECLARE @i_TransactionIsOurs   INT;
    DECLARE @dt_CurrentDatetime    DATETIME;
    SET @i_ReturnCode = dbo.fn_kSuccess( ) ;
    SET @dt_CurrentDatetime = GETUTCDATE( );
    SET @i_TransactionIsOurs = 0;
    IF @@TRANCOUNT = 0
```

```
BEGIN
   BEGIN TRANSACTION;
   SELECT
      @i_ReturnCode = @@ERROR;
   IF @i_ReturnCode <> 0
   BEGIN
      GOTO exit_label;
   END
   SET @i_TransactionIsOurs = 1;
END
DECLARE @PendingLinks TABLE
(
   [id_LocalTenantId]    UNIQUEIDENTIFIER NOT NULL
   ,[id_LinkId]          UNIQUEIDENTIFIER PRIMARY KEY
   ,[id_SourceId]        UNIQUEIDENTIFIER NOT NULL
   ,[id_DestinationId]   UNIQUEIDENTIFIER NOT NULL
   ,[dt_DeletedDatetime] DATETIME NULL
)
DECLARE @PathsUpdates TABLE
(
   [id_LocalTenantId] UNIQUEIDENTIFIER NOT NULL
   ,[id_StartId]      UNIQUEIDENTIFIER NOT NULL
   ,[id_EndId]        UNIQUEIDENTIFIER NOT NULL
   ,[i_RefCount]      INTEGER NOT NULL
)
DECLARE @destinations TABLE
(
   [id_LocalTenantId] UNIQUEIDENTIFIER NOT NULL
   ,[id_EndId]        UNIQUEIDENTIFIER NOT NULL
   ,[i_RefCount]      INTEGER NOT NULL
)
DECLARE @sources TABLE
(
   [id_LocalTenantId] UNIQUEIDENTIFIER NOT NULL
   ,[id_StartId]      UNIQUEIDENTIFIER NOT NULL
   ,[i_RefCount]      INTEGER NOT NULL
)
INSERT INTO @PendingLinks
   SELECT TOP (@batchSize)
      id_LocalTenantId
      ,id_LinkId
      ,id_SourceId
      ,id_DestinationId
      ,dt_DeletedDatetime
   FROM
      [dbo].[Links] WITH (UPDLOCK)
   WHERE
      [si_DestinationType] = dbo.fn_kDirectoryObjectClassGroup( ) AND
      [si_LinkType] = dbo.fn_LinkTypeMemberOf( ) AND
      [f_IsFlattened] = 'FALSE'
   ORDER BY
      [dt_ChangedDatetime] ASC, id_LinkId ASC
DECLARE @id_LocalTenantId UNIQUEIDENTIFIER
DECLARE @id_SourceId      UNIQUEIDENTIFIER
DECLARE @id_DestinationId UNIQUEIDENTIFIER
DECLARE @id_LinkId        UNIQUEIDENTIFIER
DECLARE @dt_DeletedDatetime DATETIME
WHILE EXISTS (SELECT TOP 1 1 FROM @PendingLinks)
BEGIN
   SELECT TOP 1
      @id_LinkId = [id_LinkId]
      ,@id_LocalTenantId = [id_LocalTenantId]
      ,@id_SourceId = [id_SourceId]
      ,@id_DestinationId = [id_DestinationId]
      ,@dt_DeletedDatetime = [dt_DeletedDatetime]
   FROM
      @PendingLinks
   -- 1. Find all nodes that are accessible via EndNode
   DELETE FROM @destinations
   INSERT INTO @destinations
      EXECUTE @i_ReturnCode = dbo.[ForwardPaths]
         @id_LocalTenantId = @id_LocalTenantId
         ,@id_StartId = @id_DestinationId
   IF @i_ReturnCode <> 0
   BEGIN
      GOTO exit_label
   END
   -- 2. Find all nodes that can reach StartNode
```

```
        DELETE FROM @sources
        INSERT INTO @sources
            EXECUTE @i_ReturnCode = dbo.[BackwardPaths]
                @id_LocalTenantId = @id_LocalTenantId
                ,@id_EndId = @id_SourceId
        IF @i_ReturnCode <> 0
        BEGIN
            GOTO exit_label
        END
        -- 3. All the nodes that can reach StartNode, need to have Paths added for all nodes
reachable by EndNode.
        -- Note: need to increase the ref count as appropriate to handle alternate paths.
        DELETE FROM @Paths Updates
        INSERT INTO @Paths Updates
            SELECT TOP (dbo.fn_MaximumNestedGroups( )) -- Do NOT allow expansion to
exceed 5,000 nested groups
                sources.[id_LocalTenantId] AS [id_LocalTenantId]
                ,sources.[id_StartId] AS [id_StartId]
                ,destinations.[id_EndId] AS [id_EndId]
                ,CASE WHEN @dt_DeletedDatetime IS NULL
                    THEN
                        sources.i_RefCount * destinations.i_RefCount
                    ELSE
                        -1 * sources.i_RefCount * destinations.i_RefCount
                    END AS [i_RefCount]
            FROM
                @destinations destinations
            CROSS JOIN
                @sources sources
            WHERE
                sources.[id_LocalTenantId] = destinations.[id_LocalTenantId] AND
                sources.[i_RefCount] > 0 AND
                destinations.[i_RefCount] > 0
        -- Test for cycles and add a path between the source and destination if one
        -- does not already exist.
        IF EXISTS (
            SELECT TOP 1
                1
            FROM
                @Paths Updates
            WHERE
                [id_StartId] = @id_DestinationId AND
                [id_EndId] = @id_SourceId)
        BEGIN
            -- If this introduces a cycle, do NOT add the entry
            DELETE FROM @Paths Updates
        END
        -- 4. Merge the expanded set of nodes into the existing paths table and add the refcount
if the path already
        --     exists (indicating addition of an alternate path).
        -- Do NOT mark the record as needing replication -- this table is not replicated.
        MERGE
            [dbo].[Paths] AS paths
        USING
            @Paths Updates AS updates
        ON
            paths.[id_LocalTenantId] = updates.[id_LocalTenantId] AND
            paths.[id_StartId] = updates.[id_StartId] AND
            paths.[id_EndId] = updates.[id_EndId] AND
            paths.[si_PathType] = dbo.fn_LinkTypeMemberOf( )
        WHEN MATCHED THEN
            UPDATE SET
                paths.[i_RefCount] = paths.[i_RefCount] + updates.[i_RefCount]
                ,[dt_CreatedDatetime] = @dt_CurrentDatetime
                ,[dt_ChangedDatetime] = @dt_CurrentDatetime
        WHEN NOT MATCHED THEN
            INSERT
                ([id_LocalTenantId]
                ,[id_StartId]
                ,[id_EndId]
                ,[si_PathType]
                ,[i_RefCount]
                ,[si_HashBucket]
                ,[dt_CreatedDatetime]
                ,[dt_ChangedDatetime]
                ,[ti_NeedsRepl])
            VALUES
                (updates.[id_LocalTenantId]
                ,updates.[id _StartId]
```

```
        ,updates.[id__EndId]
        ,dbo.fn__LinkTypeMemberOf( )
        ,updates.[i__RefCount]
        ,0 -- TODO: Need hash bucket
        ,@dt__CurrentDatetime
        ,@dt__CurrentDatetime
        ,0);
    -- 5. Mark the link as having been flattened
    -- Do NOT mark the record as needing replication -- changes to the IsFlattened flag
should NOT be
    -- replicated between databases.
    UPDATE TOP (1)
        [dbo].[Links]
    SET
        [f__IsFlattened] = 'TRUE'
    WHERE
        [id__LocalTenantId] = @id__LocalTenantId AND
        [id__LinkId] = @id__LinkId AND
        [f__IsFlattened] = 'FALSE'
    DELETE FROM
        @PendingLinks
    WHERE
        [id__LinkId] = @id__LinkId
    END
    IF @i__TransactionIsOurs = 1
    BEGIN
        COMMIT TRANSACTION;
        SET @i__TransactionIsOurs = 0;
    END
    exit__label:
    IF @i__TransactionIsOurs = 1
    BEGIN
        ROLLBACK TRANSACTION;
        SET @i__TransactionIsOurs = 0;
    END
    RETURN @i__ReturnCode ;
END
```

The above-provided pseudo code is an illustrative example only. Embodiments may be implemented in other ways as well.

The example scenarios and schemas in FIGS. 2 and 3 are shown with specific components, data types, and configurations. Embodiments are not limited to systems according to these example configurations. Asynchronously flattening a graph in a relational store may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
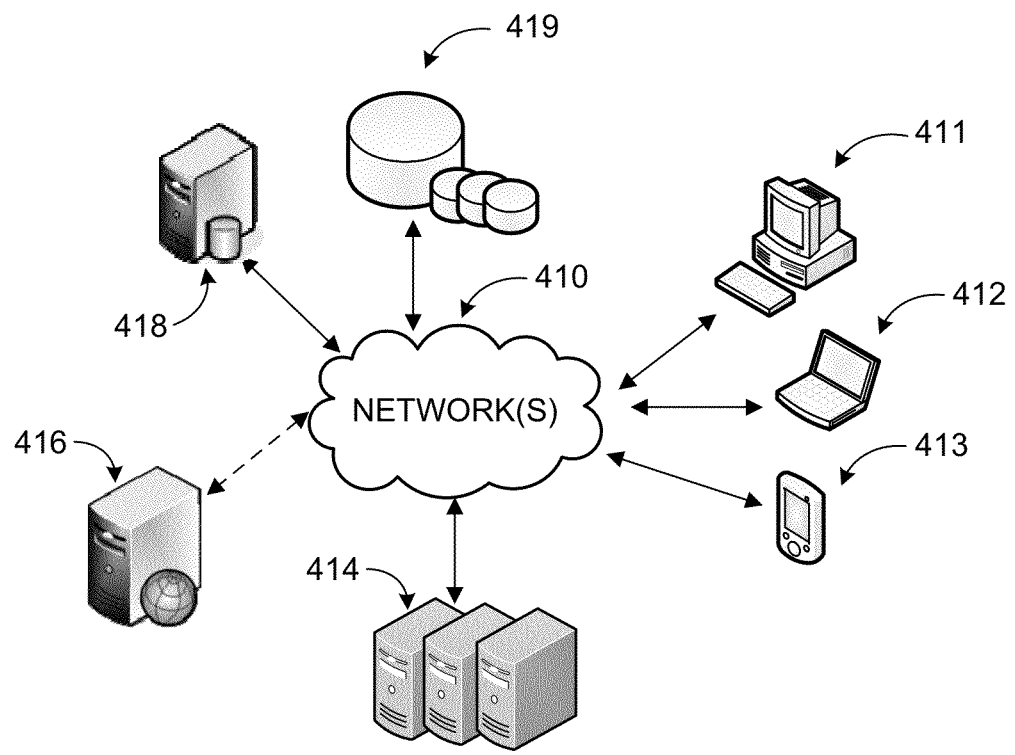
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may communicate with client interfaces on individual computing devices such as a smart phone 413, a laptop computer 412, or desktop computer 411 ('client devices') through network(s) 410.

As discussed above, an application may asynchronously flatten a graph in a relational store. The application may use a paths table to query for link paths connecting nodes. The link paths between nodes may be stored as a link. Subsequent operations may add or delete links and paths requiring re-execution of the algorithm to flatten any changes in the graph. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to asynchronously flatten a graph in a relational database. Furthermore, the networked environments discussed in FIG. 4 are for illustration purposes only. Embodiments are not limited to the example applications, modules, or processes.

Figure 5:
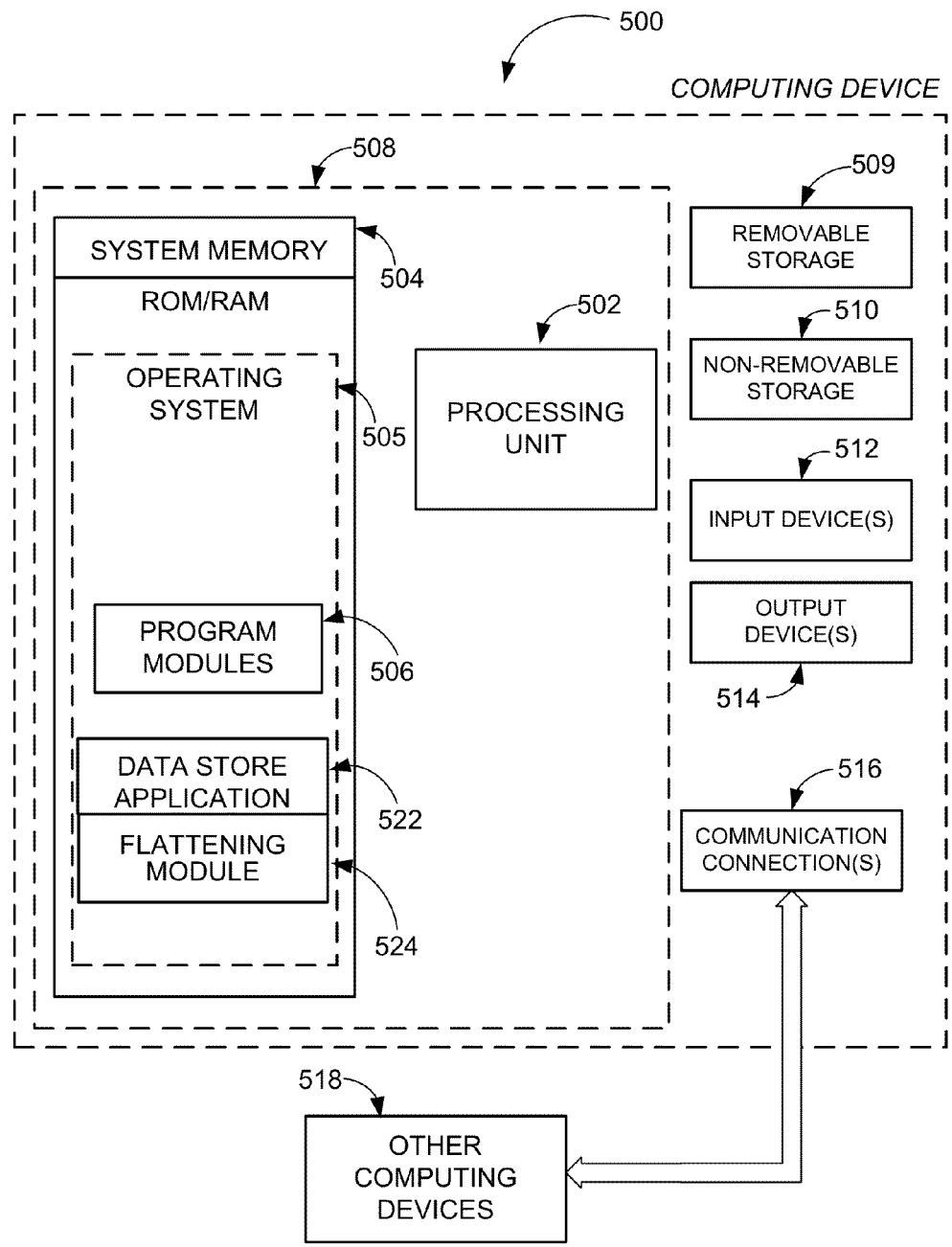
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS° operating systems from MICROSOFT CORPORATION of Redmond, Wash. The system memory 504 may also include one or more software applications such as program modules 506, data store application 522, and flattening module 524.

Data store application 522 may store links and paths according to embodiments. The flattening module 524 may execute forward expand, reverse expand, and cross-join operations to determine link paths between nodes. The flattening module 524 may sort the link paths according to start node identification. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
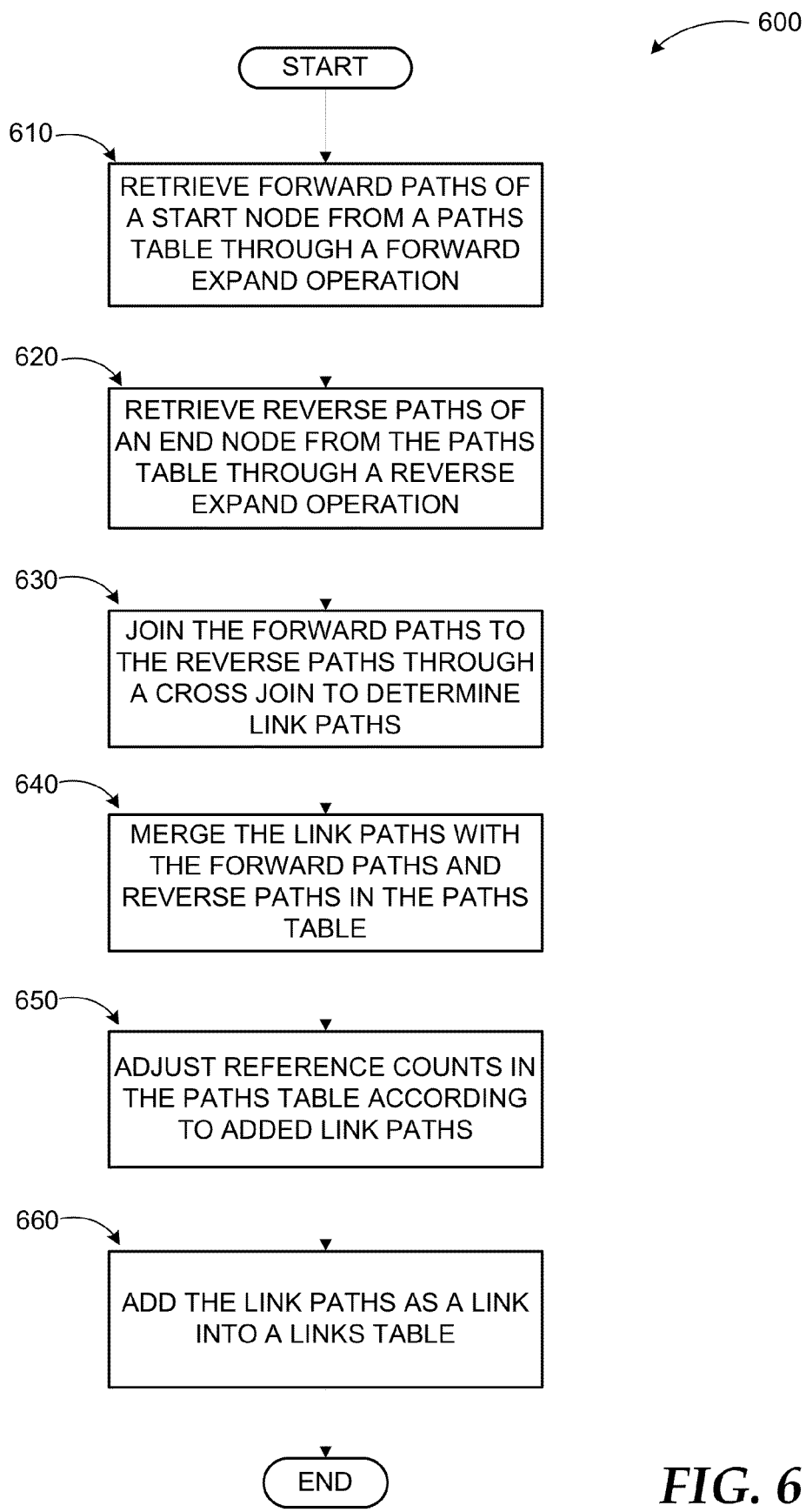
FIG. 6 illustrates a logic flow diagram for a process asynchronously flattening a graph in a relational store according to embodiments.

FIG. 6 illustrates a logic flow diagram for a process asynchronously flattening a graph in a relational store according to embodiments. Process 600 may be implemented by a data store application in some examples.

Process 600 may begin with operation 610 where an application may retrieve forward paths of a start node from a paths table through a forward expand operation. The application may query a paths table for any path starting with an identifier matching the start node. At operation 620, the application may retrieve reverse paths of an end node from the paths table through a reverse expand operation. The application may query the paths table for any path ending with an identifier matching the end node. Next, the application may join the forward paths to the reverse paths through a cross-join operation to determine link paths at operation 630. The link paths may be any path having the start node as a source and the end node as a destination.

The application may merge the link paths, the forward paths, and the reverse paths in the paths table at operation 640. Subsequently, the application may adjust reference counts in the paths table according to added link paths at operation 650. The application may increment the reference count from a previous path and may assign the incremented reference count to a link path while merging link paths into the paths table. At operation 660, the application may add the link paths as a link into a links table.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Asynchronously flattening a graph in a relational store may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:
1. A method executed on a computing device for asynchronously flattening a graph in a relational store, the method comprising:
retrieving forward paths of a start node from a paths table through a forward expand operation;
retrieving reverse paths of an end node from the paths table through a reverse expand operation;

15 joining the forward paths to the reverse paths through a cross-join operation to determine link paths between the start node and the end node;
combining the link paths, the forward paths, and the reverse paths in the paths table;
one of adjusting reference counts in the paths table and duplicating records according to added link paths;
adding the link paths as a link between the start node and the end node into a links table, wherein the link in the links table corresponds to the link paths in the paths table;
including one or more of a link identification (id) and a link type for links in the links table; and
utilizing one or more of the link type of the links and a path type of the link paths associated with the links to indicate whether the link paths are bidirectional or unidirectional.

2. The method of claim 1, wherein the paths table includes at least one path from the forward, reverse, and link paths.

3. The method of claim 1, wherein the start node and the end node are of different type.

4. The method of claim 1, further comprising:
selecting paths with a start identification (id) matching the start node as the forward paths from the paths table for the forward expand operation.

5. The method of claim 1, further comprising:
selecting paths with an end id matching the end node as the reverse paths from the paths table for the reverse expand operation.

6. The method of claim 1, wherein a reference count is an incremental number assigned to each path in the paths table.

7. The method of claim 1, further comprising:
utilizing the reference counts to count a number of paths between the start node and the end node.

8. The method of claim 1, further comprising:
executing the forward expand, reverse expand, and cross-join operations in response to detecting addition of at least one from a set of: a new path starting from the start node and a new path ending in the end node.

9. The method of claim 1, further comprising: executing the forward expand, reverse expand, and cross-join operations in response to detecting deletion of at least one from a set of: one of the forward paths starting from the start node and one of the reverse paths ending in the end node.

10. The method of claim 1, further comprising: incrementing one of the reference counts from a previous path and assigning the incremented reference count to one of the link paths while merging the link paths into the paths table.

11. A computing device for asynchronously flattening graphs in a relational store, the computing device comprising:
a memory configured to store instructions; and
a processor coupled to the memory, the processor executing an application in conjunction with the instructions stored in the memory, wherein the application is configured to:
retrieve forward paths of a start node from a paths table through a forward expand operation that includes:
selection of a subset of paths with a start identification (id) matching the start node as the forward paths from the paths table;
retrieve reverse paths of an end node from the paths table through a reverse expand operation that includes:
selection of another subset of paths with an end id matching the end node as the reverse paths from the paths table;

16 join the forward paths to the reverse paths through one of a cross-join operation and an iteration/join operation to determine link paths between the start node and the end node;
re-execute the forward expand operation, the reverse expand operation, and the cross-join operation to remove one or more of the link paths if a reference count for the one or more of the link paths is zero;
combine the link paths, the forward paths, and the reverse paths in the paths table;
one of adjust reference counts in the paths table and duplicate records according to added link paths;
add the link paths as a link between the start node and the end node into a links table, wherein the link in the links table corresponds to the link paths in the paths table; and
utilize the reference counts to count a number of the forward and reverse paths between the start node and the end node.

12. The computing device of claim 11, wherein the application is further configured to:
assign the start id of the start node as a source id of the link.

13. The computing device of claim 11, wherein the application is further configured to
assign the end id of the end node as a destination id of the link.

14. The computing device of claim 11, wherein the application is further configured to:
store the forward paths in a temporary destinations table;
store the reverse paths in a temporary sources table; and
join the temporary destinations table and the temporary sources table in a cross-join to determine the link paths.

15. The computing device of claim 14, wherein the application is further configured to:
sort the link paths by the start id of the start node.

16. A computer-readable memory device with instructions stored thereon for asynchronously flattening graphs in a relational store, the instructions comprising:
retrieving forward paths of a start node from a paths table through a forward expand operation that includes:
selection of a subset of paths with a start identification (id) matching the start node as the forward paths from the paths table;
retrieving reverse paths of an end node from the paths table through a reverse expand operation that includes:
selection of another subset of paths with an end id matching the end node as the reverse paths from the paths table;
joining the forward paths to the reverse paths through a cross-join operation to determine link paths between the start node and the end node;
re-executing the forward expand operation, the reverse expand operation, and the cross-join operation to remove one or more of the link paths if a reference count for the one or more of the link paths is zero;
combining the link paths, the forward paths, and the reverse paths in the paths table;
one of adjusting reference counts in the paths table and duplicating records according to added link paths;
sorting the link paths by start id of the start node;
adding the link paths as a link between the start node and the end node into a links table, wherein the link in the links table corresponds to the link paths in the paths table;
including one or more of a link identification (id) and a link type for links in the links table; and utilizing one or more of the link type of associated with the links and a path type of the link paths associated with the links to indicate whether the link paths are bidirectional or unidirectional; and utilizing the reference counts to count a number of forward and reverse paths between the start node and the end node.

17. The computer-readable memory device of claim 16, wherein the instructions further comprise:

grouping the link paths by a start id of each link path.

18. The computer-readable memory device of claim 16, wherein the instructions further comprise:

grouping the link paths by an end id of each link path.

19. The computer-readable memory device of claim 16, wherein the instructions further comprise:

deleting the link paths in the paths table in response to deletion of the link from the links table.

\* \* \* \* \*